(12) United States Patent
Jie et al.

(10) Patent No.: US 7,729,710 B2
(45) Date of Patent: Jun. 1, 2010

(54) METHOD AND APPARATUS FOR FILTERING SHORT MESSAGE SYSTEM SPAM

(75) Inventors: Guo Chang Jie, Beijing (CN); Song Song, Beijing (CN); Pei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 11/687,044

(22) Filed: Mar. 16, 2007

(65) Prior Publication Data

US 2007/0254683 A1 Nov. 1, 2007

(30) Foreign Application Priority Data

Apr. 27, 2006 (CN) .................. 2006 1 0077128

(51) Int. Cl.
*H04W 4/00* (2009.01)
(52) U.S. Cl. .................. 455/466; 455/412.1; 455/412.2; 455/414.1; 369/29.01; 369/29.02
(58) Field of Classification Search .................. 455/502, 455/127.4
See application file for complete search history.

(56) References Cited

U.S. PATENT DOCUMENTS

| | | | |
|---|---|---|---|
| 2003/0083078 A1 | 5/2003 | Allison et al. | |
| 2005/0020289 A1 | 1/2005 | Kim et al. | |
| 2005/0182710 A1 | 8/2005 | Andersson et al. | |
| 2005/0186974 A1* | 8/2005 | Cai | 455/466 |
| 2005/0222933 A1 | 10/2005 | Wesby | |
| 2005/0228754 A1 | 10/2005 | Pezzaniti et al. | |
| 2005/0278620 A1 | 12/2005 | Baldwin et al. | |
| 2006/0010379 A1 | 1/2006 | Kashi | |
| 2006/0135168 A1* | 6/2006 | Cai et al. | 455/445 |

FOREIGN PATENT DOCUMENTS

CN 1426214 6/2003

* cited by examiner

*Primary Examiner*—Nick Corsaro
*Assistant Examiner*—Quan M Hua
(74) *Attorney, Agent, or Firm*—Schmeiser, Olsen & Watts; William H. Steinberg

(57) ABSTRACT

A method for filtering spam directed at mobile phones in a short message system (SMS). A short message includes message content, and both a mobile phone number and a first authentication code of a destination mobile phone. A second authentication code of the destination mobile phone is stored in a memory. The short message is received and the first authentication code and the second authentication code are extracted from the short message and the memory, respectively. If it is ascertained that the extracted first authentication code does not match the extracted second authentication code, then the short message is determined to be SMS spam and is prevented from being subsequently received by the destination mobile phone. Otherwise the short message is determined to not be SMS spam and is not prevented from being subsequently received by the destination mobile phone. An authentication apparatus within the SMS performs the method.

17 Claims, 7 Drawing Sheets

METHOD AND APPARATUS FOR FILTERING SHORT MESSAGE SYSTEM SPAM

FIELD OF THE INVENTION

The present invention relates to a method and apparatus for filtering short message system (SMS) spam.

BACKGROUND OF THE INVENTION

The short message system (SMS) has become a very popular approach to distribute advertising because of its largest possible range of audiences and low cost. This obviously results in a more and more serious SMS spam problem.

Spam is not new in the information technology (IT) industry. Notorious email spam has bothered Internet users for a long time. There are already some technologies that may deal with the email spam, including content filtering, white list and black list. However, one of the most important and effective methods for preventing email spam is to protect email address carefully and not reveal email address to spammers unconsciously.

The SMS spam problem is becoming more complex, because the numbers of mobile phones are more regular and continuous. SMS spammers needn't collect the numbers of mobile phones as email spammers. SMS spammers can easily obtain a large amount of mobile phone numbers by emulating each number of a predefined continuous phone number segment, which is also a very popular method for existing SMS spam systems.

SUMMARY OF THE INVENTION

The present invention provides a method for filtering spam directed at mobile phones in a short message system (SMS), said method comprising:

receiving, by an authentication apparatus within the SMS, a short message originating from a sending apparatus and directed to a destination mobile phone, wherein the short message received by the authentication apparatus comprises message content, a mobile phone number of the destination mobile phone, and a first authentication code of the destination mobile phone, wherein a second authentication code of the destination mobile phone is stored in a memory accessible to the authentication apparatus, and wherein the short message has not been delivered to the destination mobile phone when received by the authentication apparatus, extracting, by the authentication apparatus from the short message, the first authentication code of the destination mobile phone;

extracting, by the authentication apparatus from the memory, the second authentication code of the destination mobile phone;

ascertaining, by the authentication apparatus, whether the extracted first authentication code matches the extracted second authentication code;

if said ascertaining ascertains that the extracted first authentication code does not match the extracted second authentication code, then the method further comprises after said ascertaining: determining that the short message is SMS spam and preventing the short message from being subsequently received by the destination mobile phone, said determining that the short message is SMS spam and said preventing being performed by the authentication apparatus;

if said ascertaining ascertains that the extracted first authentication code matches the extracted second authentication code, then the method further comprises after said ascertaining: determining that the short message is not SMS spam and not preventing the short message from being subsequently received by the destination mobile phone, said determining that the short message is not SMS spam and said not preventing being performed by the authentication apparatus.

The invention can protect mobile phone users from being disturbed by SMS spam to a great extent, while not introducing more burdens to normal short message sending procedures of mobile users.

DETAILED DESCRIPTION OF THE INVENTION

Figure 1:
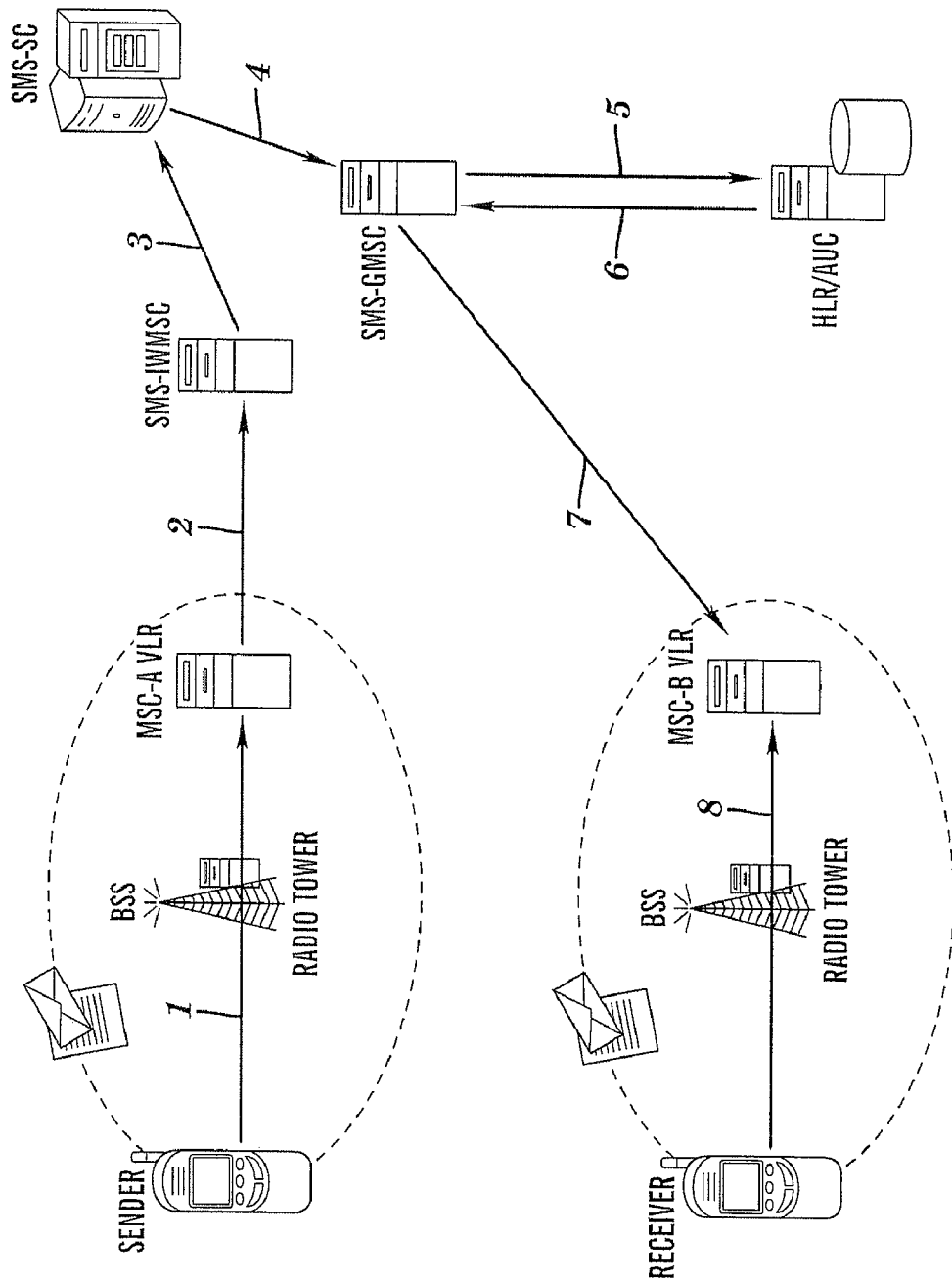
FIG. 1 shows the architecture of an existing short message forwarding system.

The present invention provides a short message forwarding method and system capable of eliminating short message system (SMS) spam to a great extent, a server for filtering SMS spam, and a corresponding short message receiving and sending apparatus. Although the scope of the present invention is applicable generally to sending of a short message from a sending apparatus to a destination apparatus, the description herein of the present invention includes embodiments in which the destination apparatus is a mobile phone, and the sending apparatus may be a mobile phone as well.

In the present invention, each mobile phone user is able to set a particular number string as each user's anti-SMS-spam ID, the maximum length of which can be predefined by mobile carriers. Anyone who wants to send a short message to the mobile phone user who has set the anti-SMS-spam ID may add the user's set anti-SMS-spam ID at the end of the receiver's original mobile phone number, and the anti-SMS-spam ID is used as an authentication code. If the attached anti-SMS-spam ID is correct, then the short message will be sent to the receiver normally. Otherwise, the short message will be considered as SMS spam.

According to an aspect of the present invention, there is provided a short message forwarding method, including: providing authentication codes for apparatus capable of receiving short messages, and correspondingly storing the numbers of the apparatus and their authentication codes; extracting the number of a destination apparatus from a short message; extracting the authentication code attached in the short message by a sender from the short message; verifying whether the authentication code attached in the short message matches the stored authentication code of the destination apparatus; and refusing to deliver the short message to the destination apparatus if the two do not match with each other.

According to another aspect of the present invention, there is provided a short message forwarding system, including: a memory for correspondingly storing the numbers of apparatuses capable of receiving short messages and their authentication codes; a number extracting means for extracting the number of a destination apparatus from a short message; an authentication code extracting means for extracting the authentication code attached in the short message by a sender; an authentication code verifying means for verifying whether the authentication code attached in the short message matches the authentication code of the destination apparatus stored in the memory; a SMS spam handling means for deciding the short message to be SMS spam in the case where the authentication code verifying means decides that there is no match, thereby the short message forwarding system refuses to deliver the short message to the destination apparatus.

According to still another aspect of the present invention, there is provided a server for filtering SMS spam in a short message forwarding system, including: a memory for correspondingly storing the numbers of apparatuses capable of receiving short messages and their authentication codes; a number extracting means for extracting the number of a destination apparatus from a short message; an authentication code extracting means for extracting the authentication code attached in the short message by a sender from the short message; an authentication code verifying means for verifying whether the authentication code attached in the short message matches the authentication code of the destination apparatus stored in the memory; and a SMS spam handling means for deciding the short message to be SMS spam in the case where the authentication code verifying means decides that there is no match, thereby the short message forwarding system refuses to deliver the short message to the destination apparatus.

According to yet another aspect of the present invention, there is provided an apparatus capable of sending and receiving short messages, including: an authentication code maintaining means for storing authentication codes of respective destination apparatus correspondingly to numbers of the destination apparatus, and an authentication code attaching means for attaching the authentication code corresponding to the number of the destination apparatus in a short message to be sent.

The architecture of an existing short message forwarding system is described with reference to FIG. 1. In FIG. 1, stages of an existing short message forwarding procedure are labeled as stages 1-8.

In stage 1, when a mobile phone user A wants to send a short message to another mobile phone user B, the sender A predefines the address of a SMS service center (SMS-SC), the mobile phone number of the receiver B, and the content of the short message, said content being text limited to no more than 160 characters. The short message, which comprises the text content and the mobile phone number of the receiver B, is first delivered to a corresponding mobile switching center (MSC-A) through a base station system (BSS).

In stage 2, according to the address of the SMS-SC, the MSC-A sends the short message to a corresponding SMS internetworking MSC (SMS-IWMSC).

In stage 3, the short message is delivered to the SMS-SC and stored in a database before being sent to the receiver B.

In stage 4, the SMS-SC builds a new message packet, SM-TPMS-DELIVER, and sends the SM-TPMS-DELIVER packet to its SMS Gateway MSC (SMS-GMSC). The SM-TPMS-DELIVER packet includes the content of the short message, an ID (number) of the original sender A and the receiving time.

In stage 5, according to the MSISDN (Mobile Station International ISDN (Integrated Service Digital Network) number) of the receiver B, the SMS-GMSC sends a request to a corresponding home location register (HLR) (HLR-ENQ, HLR Enquiry) to inquire the current location of the receiver B. This inquiry is processed by a MAP/CSENDROUTING-INFO diagram for SMS.

In stage 6, the HLR returns the result of the inquiry to the SMS-GMSC. The result of the inquiry may be a rejecting diagram which shows the receiver B is not available now, or a MAP/CSENDROUTINGINFOFORSHORTMES-SAGERESULT diagram containing the MSC-B/VLR that the receiver B is accessing receiver B's mobile phone.

In stage 7, the SMS-GMSC sends the short message to the MSC-B/VLR.

In stage 8, the MSC-B/VLR delivers the short message to the receiver B.

A method and system for preventing SMS spam according to the invention are described below.

According to the short message forwarding method and system of the invention, each mobile phone user may set a particular number string as each user's anti-SMS-spam ID, and the anti-SMS-spam ID may function as an authentication code of the mobile phone or its user in the short message forwarding procedure, and thus the anti-SMS-spam ID may also be denoted as the authentication code of the mobile phone or its user. The maximum length of the anti-SMS-spam ID may be predefined by mobile carriers. Anyone who wants to send a short message to the mobile phone user who has set the anti-SMS-spam ID may add the set anti-SMS-spam ID at the end of the receiver's original mobile phone number. The short message forwarding system authenticates the anti-SMS-spam ID. If the attached anti-SMS-spam ID is correct, the short message will be sent to the receiver normally. Otherwise, the short message will be considered as SMS spam.

On one hand, for those SMS spam auto-sending robots which always emulate all potential mobile phone numbers of a predefined continuous number segment, an anti-SMS-spam ID with a length x will lead to $10^x$ times cost and time than their original works.

On the other hand, for a normal SMS sending procedure, a sender need only input the anti-SMS-spam ID of a receiver at the end of the receiver's mobile phone number. In fact, the receiver may also directly publish this anti-SMS-spam ID as a part of the receiver's mobile phone number. Other users can save the receiver's anti-SMS-spam ID in the other users' directories. This will not affect any voice and messaging service.

Figure 2:
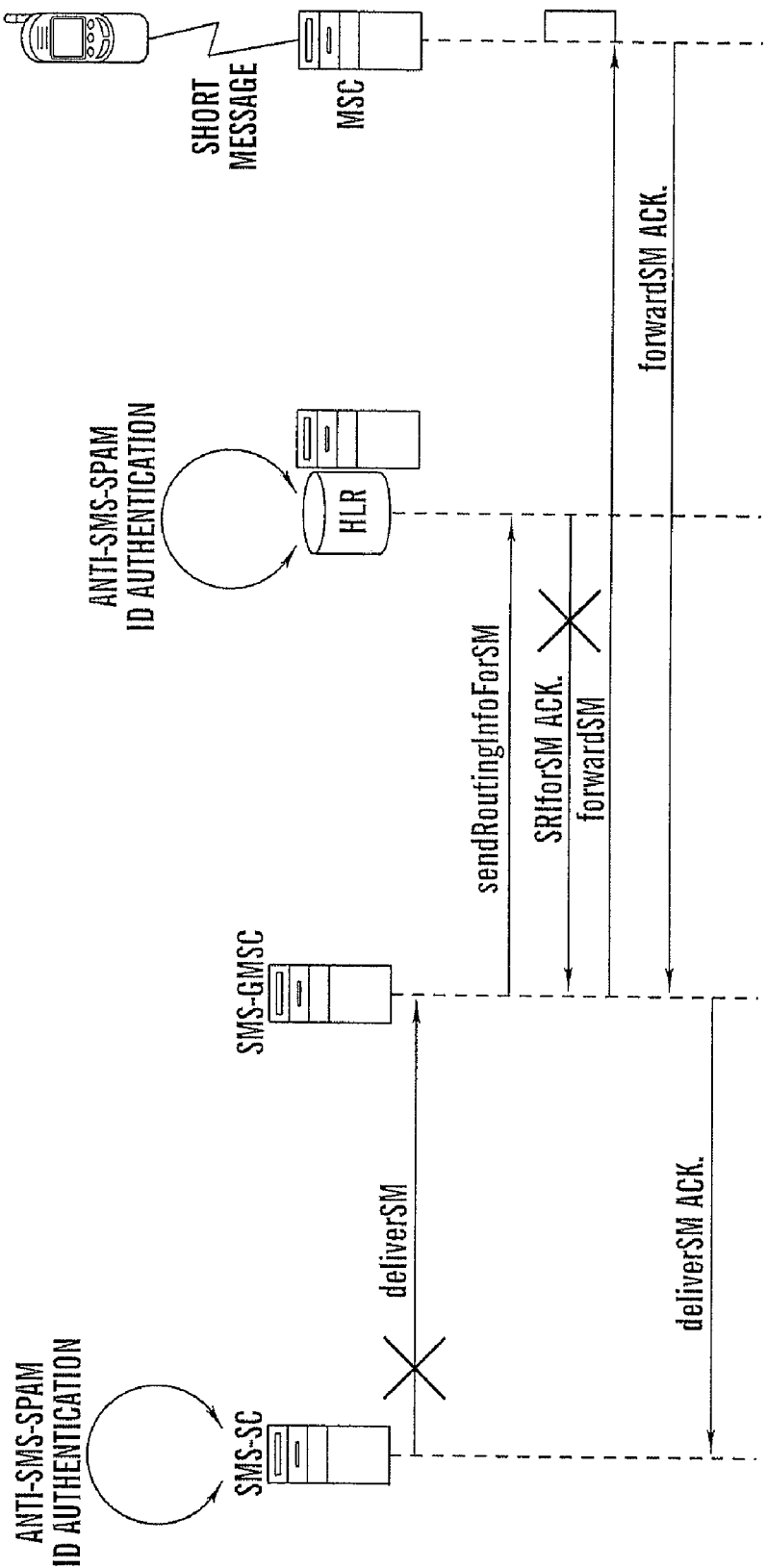
FIG. 2 shows two possible approaches for realizing an authentication operation in a SMS-SC or a HLR, in accordance with the present invention

The operation of authenticating the anti-SMS-spam ID of the invention may be implemented by an authenticating mechanism in any one or more suitable devices in the short message forwarding system. For example, as shown in FIG. 2 in accordance with the present invention, the authenticating mechanism may be implemented in the SMS-SC or the HLR.

If the short message passes the anti-SMS-spam ID authentication, the sending operation is performed normally; that is, the SMS-SC delivers the short message to the SMS-GMSC (deliverSM), the SMS-GMSC inquires routing information to the HLR sendRoutingInfoForSM), and the HLR returns an acknowledgment message to the SMS-GMSC and provides the routing information (SRIforSM Ack). The SMS-GMSC forwards the short message to the MSC that the receiver is accessing according to the routing information provided by the HLR (forwardSM). The MSC that the receiver is accessing returns a forwarding acknowledgment to the SMS-GMSC (forwardSM Ack). Accordingly, the SMS-GMSC returns a delivery acknowledgement to the SMS-SC (deliverSM Ack).

If the short message does not pass the anti-SMS-spam ID authentication executed by the authenticating mechanism in the SMS-SC, then the short message is not delivered to the SMS-GMSC (deliverSM). If the short message does not pass the anti-SMS-spam ID authentication executed by the authenticating mechanism in the HLR, then the routing information is not returned to the SMS-GMSC (SRIforSM Ack). Thus, both of the preceding two approaches can achieve the object of filtering SMS spam.

Figure 3:
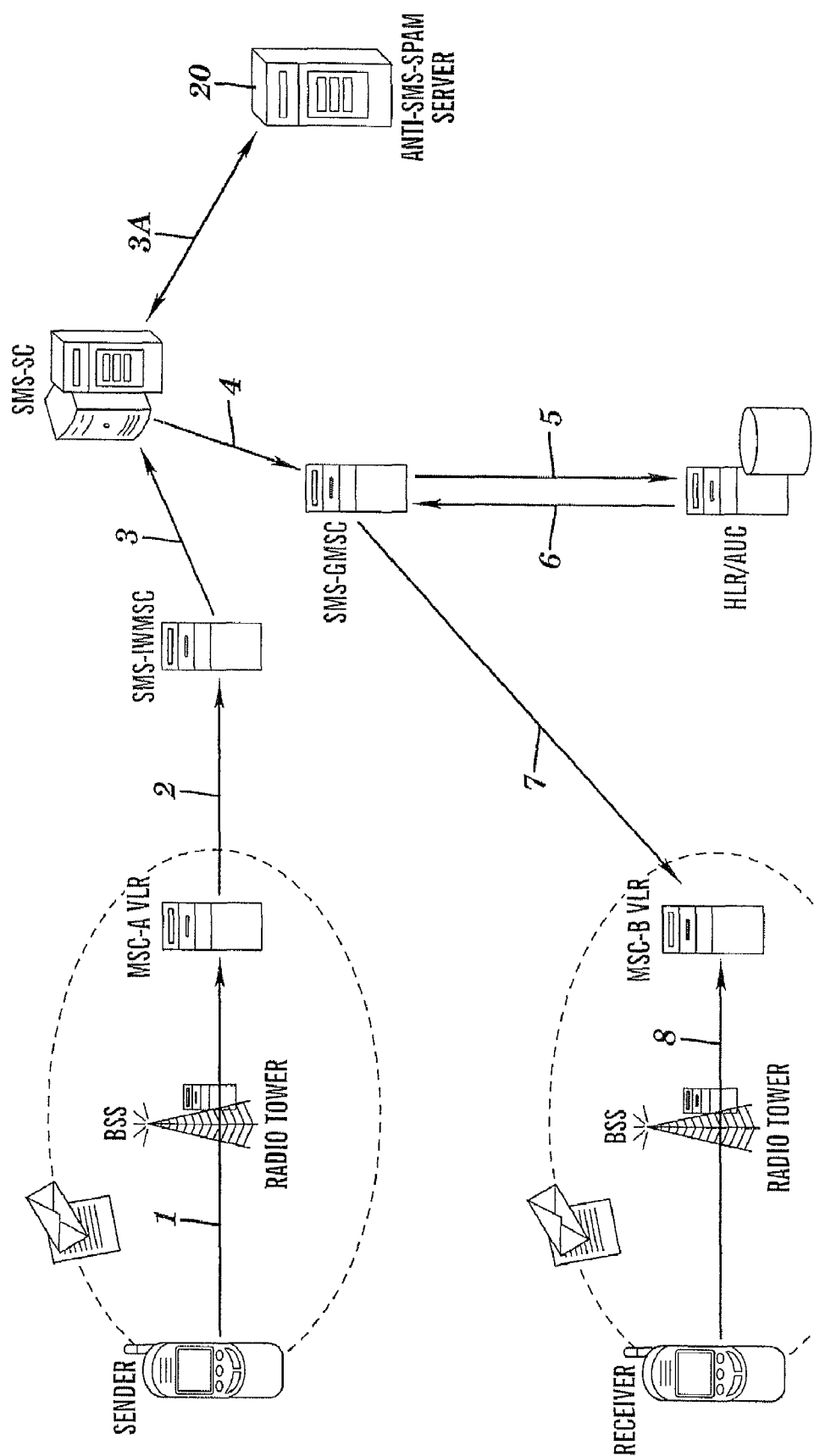
FIG. 3 shows the architecture of a short message forwarding system which provides a service of filtering SMS spam with a special server, in accordance with the present invention

Alternatively, as shown in FIG. 3 in accordance with the present invention, an anti-SMS-spam server 20 may be provided to provide the service of filtering SMS spam. The architecture of the short message forwarding system in FIG. 3 has an additional server 20 specialized in filtering SMS spam, as compared with that in FIG. 1, and accordingly, stage 3A is added after stage 3. Stages 1-3 and 5-8 in FIG. 3 are substantially the same as stages 1-3 and 5-8 in FIG. 1, except that in stage 1 in FIG. 3, the sender additionally includes the anti-SMS-spam ID of the receiver in the short message (e.g., behind the mobile phone number of the receiver B). Thus, the short message received by the SMS-SC comprises the message, the mobile phone number of the receiver B, and the anti-SMS-spam ID of the receiver B. In stage 3A in FIG. 3, the SMS-SC delivers the short message to the anti-SMS-spam server 20 before delivering the short message to the SMS-GMSC. The anti-SMS-spam server 20 returns a refusal message to the SMS-SC if the anti-SMS-spam server 20 refuses to forward the short message. The SMS-SC builds the new message packet according to the short message modified by the anti-SMS-spam server 20. In stage 4 of FIG. 3, the SMS-SC sends the new message packet to the SMS-GMSC.

Figure 4:
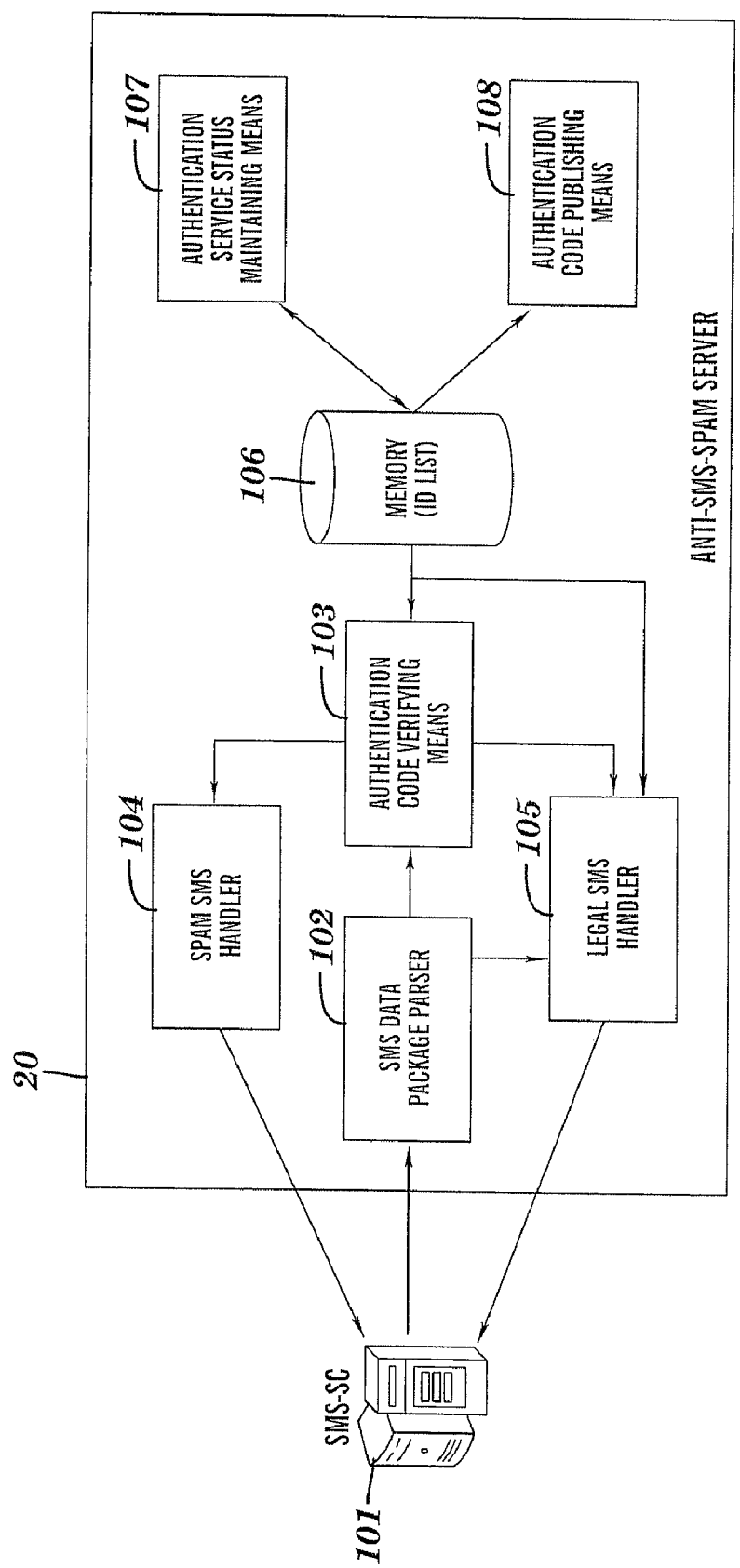
FIG. 4 shows a block diagram of main component parts of the specially provided server for filtering SMS spam according to the present invention shown in FIG. 3

FIG. 4 shows a block diagram of main component parts of the anti-SMS-spam server 20 of FIG. 3 for filtering SMS spam according to the present invention. Although the preceding specification provides, by way of example, an embodiment of performing the method for filtering SMS spam of the invention by the anti-SMS-spam server 20, those skilled in the art should understand that these parts may completely be provided in a suitable existing device in the short message forwarding system, for example, in the SMS-SC, or in the HLR, as indicated supra, and these parts may even be dispersed in a plurality of devices in the system, as long as the SMS spam authentication operation according to the invention is completed properly before the short message is sent to the receiver.

Figure 5:
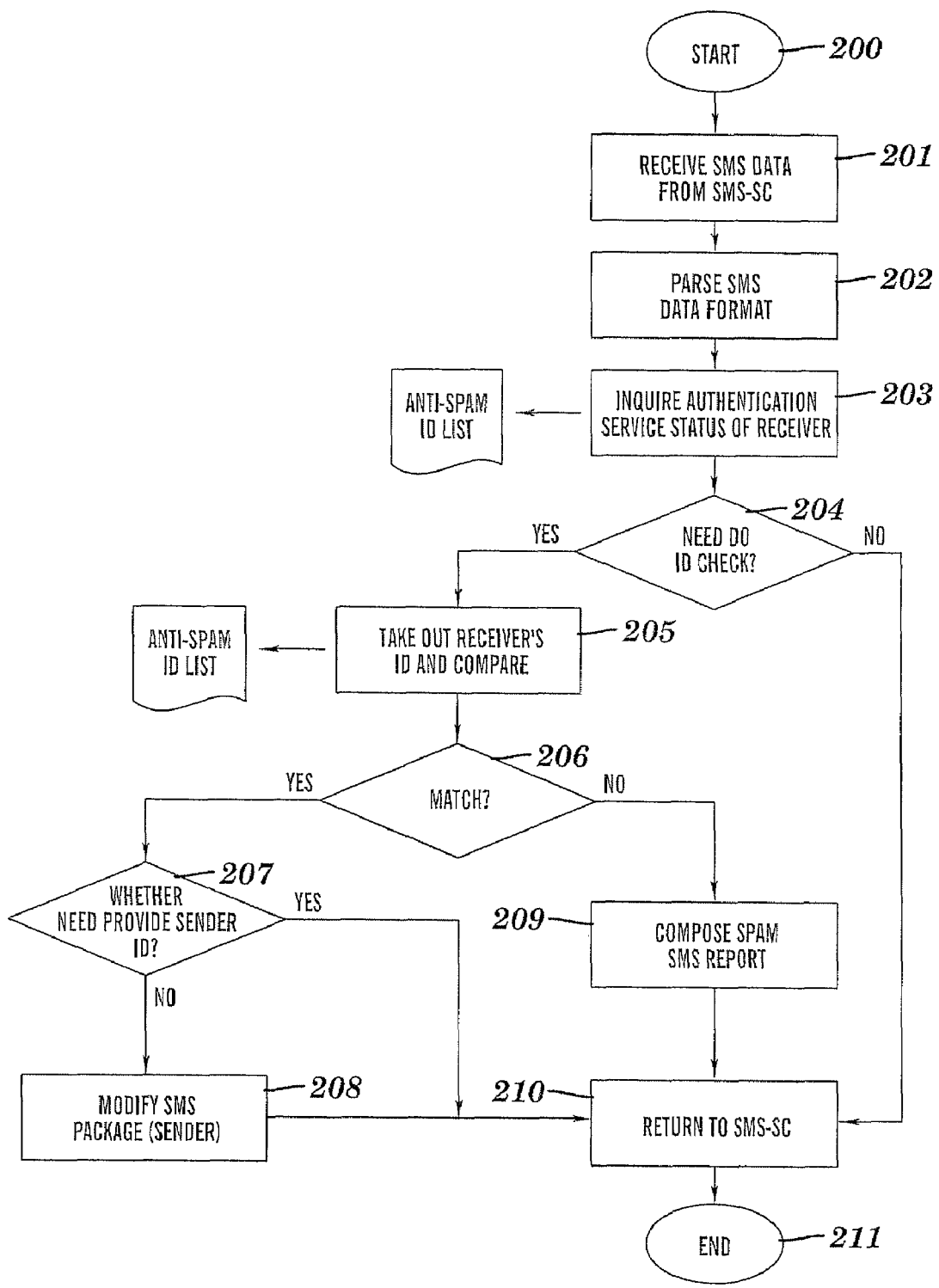
FIG. 5 shows a flow chart of an authenticating mechanism related to filtering SMS spam in a short message forwarding procedure according to the present invention.

FIG. 5 shows a flow chart of an authenticating mechanism related to filtering SMS spam in a short message forwarding procedure according to the present invention.

The short message forwarding method according to the present invention is described with reference to FIG. 4 and FIG. 5 next. It is noted that an anti-SMS-spam ID is provided for each mobile phone user as the user's authentication code. The anti-SMS-spam ID may be set by the user, or may be specified by the system in advance and communicated to the user. The application of the anti-SMS-spam ID will increase the sending difficulty of SMS spammers to a great extent.

An authentication service status maintaining means 107 provides operations of subscribing, activating, pausing, and canceling the authentication service for a user, and the user can set the user's anti-SMS-spam ID by the authentication service status maintaining means 107. The user can access the authentication service status maintaining means 107 through face-to-face service, short messages and web, so as to perform the operations the user desires.

A memory 106 stores mobile phone numbers and anti-SMS-spam IDs correspondingly in the form of, for example, an anti-SMS-spam ID list, and accordingly stores authentication service statuses of mobile phone users.

An authentication code publishing means 108 provides a convenient, quick and safe anti-SMS-spam ID publishing approach for the users, and can distribute a user's authentication code to the mobile phone of at least one of the other users according to the user's request. The detailed strategy on how to publish the user's anti-SMS-spam ID may depend on each user's choice.

When a short message sender sends a short message, the sender attaches the anti-SMS-spam ID of a receiver in the short message additionally. By way of example, the anti-SMS-spam ID may be attached behind the phone number of the receiver. Of course, there are other solutions. For example, the anti-SMS-spam ID may be attached before the telephone number, or in a definite position such as the foremost or rearmost position in the content of the short message.

After the sender sends the short message, the short message is delivered one stage after another as shown in FIG. 2, and after the short message is delivered to the SMS-SC, the SMS-SC delivers the short message to the anti-SMS-spam server 20 for filtering SMS spam, with which the method shown in FIG. 5 starts (step 200). As described above, the method of the invention may also start in other suitable devices in the short message forwarding system.

Figure 6:
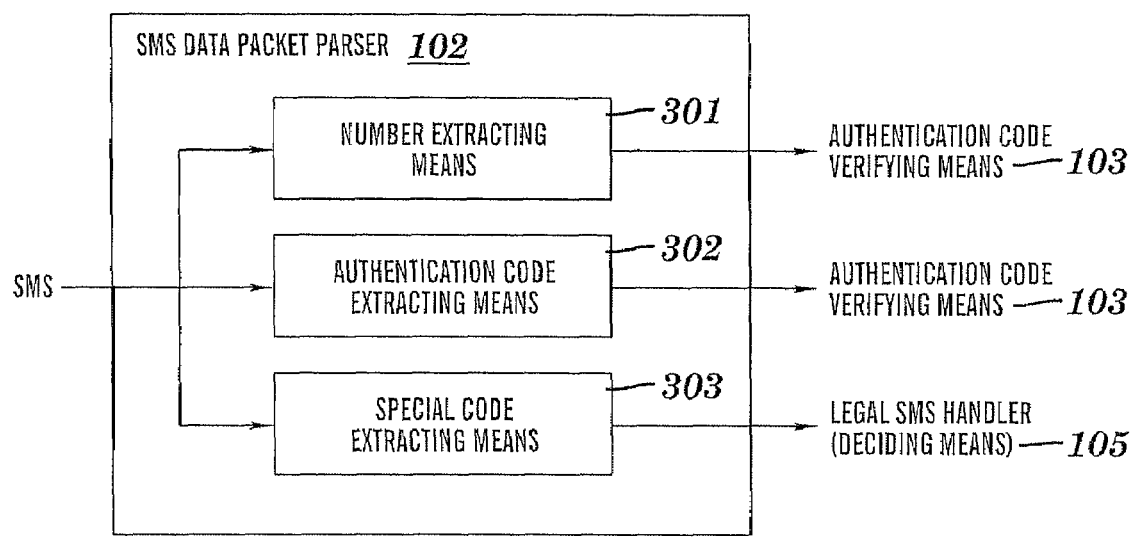
FIG. 6 shows component parts of a short message data packet parse, in accordance with the present invention.

Initially, the anti-SMS-spam server 20 receives the short message data from the SMS-SC (step 201). A short message data packet parser 102 parses the data format of the short message (step 202) and extracts values of key fields from the original short message packet for later use. As shown in FIG. 6 in accordance with embodiments of the present invention, the short message data packet parser 102 comprises a number extracting means 301, an authentication code extracting means 302, and a special code extracting means 303. The number extracting means 301 extracts the mobile phone number of the receiver (destination) from the short message data packet. The authentication code extracting means 302 extracts the anti-SMS-spam ID attached in the short message by the sender from the short message data packet. The special code extracting means 303 extracts, from the short message data packet, a specified special code attached in the short message when the sender does not want to provide the sender's authentication code to the destination apparatus. The special code will be described below.

An authentication code verifying means 103 obtains the authentication service status of the receiver according to the mobile phone number thereof (step 203), and decides whether a SMS spam check is needed according to the obtained status (step 204).

If it is decided that the spam check is not needed, then the procedure turns to step 210, and the short message is returned to the SMS-SC via a legal short message handler 105. If it is decided that the check is needed, the authentication code verifying means 103 extracts the anti-SMS-spam ID of the receiver from, for example, an anti-SMS-spam ID list stored in the memory 106 (Step 205), and verifies whether the anti-SMS-spam ID attached by the sender and extracted from the short message matches the anti-SMS-spam ID of the receiver stored in the memory 106 by comparison (step 206).

If the anti-SMS-spam ID of the receiver extracted from the anti-SMS-spam ID list does not match the anti-SMS-spam ID extracted from the short message, then the short message is decided to be SMS spam, and a SMS spam handler 104 composes a SMS spam report and returns the SMS spam report to the SMS-SC (step 210) to notify the SMS-SC that the short message is SMS spam, wherein the MS spam report is stored in the SMS-SC. In response, the SMS-SC refuses to forward the short message to the receiver. The SMS-SC may issue an error report to the sender, or just simply ignore the short message.

If the anti-SMS-spam ID of the receiver extracted from the anti-SMS-spam ID matches the anti-SMS-spam ID extracted from the short message, then it is decided that the short message is not SMS spam, and the short message is processed by the legal short message handler 105. The legal short message handler 105 may comprise a deciding means and a sending apparatus authentication code providing means (not shown in FIG. 4). The deciding means decides whether the authentication code of the sending apparatus is needed to be provided to the receiving apparatus (i.e., destination apparatus or destination mobile phone) by judging whether the sender has also activated the authentication service (step 207), and in the case where the authentication service has been activated, the sending apparatus authentication code providing means attaches the anti-SMS-spam ID of the sender in the short message together with the mobile telephone number of the sender, so as to be provided to the destination apparatus. In the case where the anti-SMS-spam ID of the receiver is attached at the end of the mobile phone number of the receiver when sending a short message, the sending apparatus authentication code providing means attaches the anti-SMS-spam ID of the sender at the end of the sender's mobile phone number. Thus, the receiver can reply to the short message directly without additionally inputting the mobile phone number and the anti-SMS-spam ID of the original sender.

However, if the sender explicitly declares that the sender does not want to be replied to; i.e. the sender wants to protect the sender's anti-SMS-spam ID instead of providing the sender's anti-SMS-spam ID to the receiver, then the sending apparatus authentication code providing means does not incorporate the anti-SMS-spam ID of the sender into the short message to be sent to the receiver. For example, the sender may attach a specified special code in the short message the sender sends (for example, behind the mobile phone number and anti-SMS-spam ID of the receiver, or in a particular position in the content of the short message), so as to indicate that the sender does not want to publish the sender's anti-SMS-spam ID to the receiver. The special code may be "*", "#", or a particular combination of numbers.

In the case where the special code is attached in the short message, as described above, the special code extracting means 303 will extract the attached special code from the short message. The deciding step 207 executed by the deciding means further comprises deciding whether a special code is extracted from the short message. If the special code is extracted, it is decided that the anti-SMS-spam ID of the sender needs to be protected, and the legal short message handler 105 directly returns the short message to the SMS-SC (step 210). If the special code is not extracted, the sending apparatus authentication code providing means modifies the short message packet (i.e., incorporates the anti-SMS-spam ID of the sender into the short message to be sent to the receiver) (step 208), and the legal short message handler 105 returns the short message to the SMS-SC after the sending apparatus authentication code providing means modifies the short message packet (step 210). The example in which the anti-SMS-spam ID of the sender is provided by default and the sender shows that the sender does not want to provide the sender's anti-SMS-spam ID to the receiver by attaching the special code is described here. However, those skilled in the art should understand that, it may completely be reversed so that the anti-SMS-spam ID of the sender is not provided by default, and the sender shows that the sender wants to provide the sender's anti-SMS-spam ID to the receiver by attaching the special code. Therefore, the deciding means decides whether the anti-SMS-spam ID of the sender is needed to be provided to the receiver according to whether the specified special code exists in the short message, and the predefined meaning of the specified special code.

The procedure of filtering SMS spam in the short message forwarding system is completed in step 211, and the system correspondingly performs the processing of forwarding or refusing to forward according to the result of the above processing.

Hereinbefore, a description is made using a mobile phone as the apparatus for sending and receiving short messages. Those skilled in the art should understand that it is completely possible to perform the operations of sending and receiving short messages through many other apparatuses.

In order to facilitate sending and receiving short messages in the short message forwarding system according to the invention, the invention further provides an improved apparatus capable of sending and receiving short messages, for example, a mobile phone.

Figure 7:
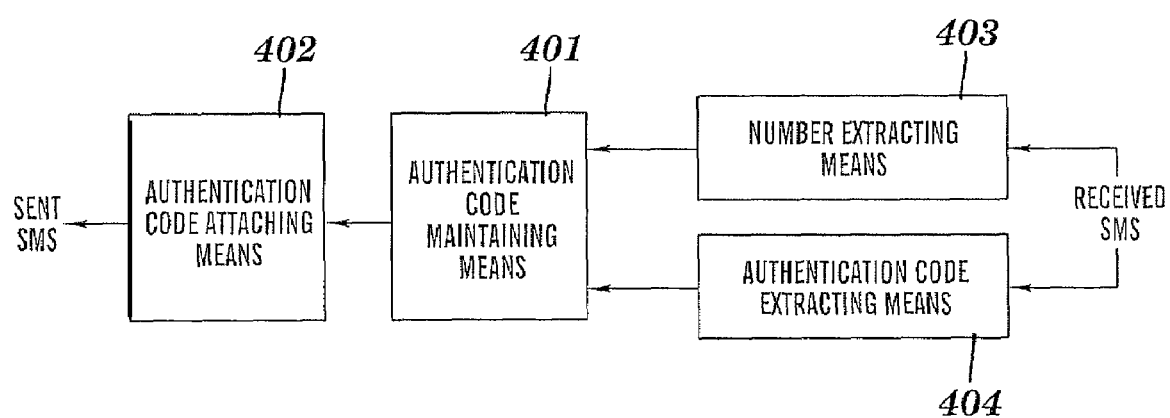
FIG. 7 shows a block diagram of an improved apparatus capable of sending and receiving short messages, in accordance with the present invention.

As shown in FIG. 7, in accordance with the present invention, in addition to the common parts required for sending and receiving short messages, the apparatus capable of sending and receiving short messages further comprises an authentication code maintaining means 401 for storing authentication codes of respective destination apparatuses corresponding to numbers of the destination apparatus (e.g., mobile telephone numbers), and an authentication code attaching means 402 for attaching the authentication code corresponding to the number of the destination apparatus in a short message to be sent. Additionally, the apparatus capable of sending and receiving short messages may also include a number extracting means 403 for extracting the number of the sending apparatus of a received short message from the short message, and an authentication code extracting means 404 for extracting, from the received short message, the authentication code attached therein, wherein said authentication code maintaining means correspondingly stores the number and the authentication code of the sending apparatus extracted from the received short message.

Although the invention has been particularly shown and described with reference to the preferred embodiments thereof, those of ordinary skill in the art should understand that various modifications may be made in form and details therein without departing from the spirit and scope of the invention as defined by the appended claims.

What is claimed is:

1. A method for filtering spam directed at mobile phones in a short message system (SMS), said method comprising:

receiving, by an authentication apparatus, a short message originating from a sending apparatus and directed to a destination mobile phone, wherein the sending apparatus is a sending mobile phone, wherein the short message received by the authentication apparatus comprises message content, a mobile phone number of the destination mobile phone, and a first authentication code of the destination mobile phone, wherein a second authentication code of the destination mobile phone is stored in a memory accessible to the authentication apparatus, and wherein the short message has not been delivered to the destination mobile phone when received by the authentication apparatus, extracting, by the authentication apparatus from the short message, the first authentication code of the destination mobile phone;

extracting, by the authentication apparatus from the memory, the second authentication code of the destination mobile phone;

ascertaining, by the authentication apparatus, that the extracted first authentication code matches the extracted second authentication code;

after said ascertaining: determining that the short message is not SMS spam and not preventing the short message from being subsequently received by the destination mobile phone, said determining that the short message is not SMS spam and said not preventing being performed by the authentication apparatus, determining, by the authentication apparatus after said ascertaining, that an authentication service status of the sending apparatus is activated; and responsive to said determining that the authentication service status of the sending apparatus is activated, including, by the authentication apparatus, an authentication code of the sending mobile phone along with a mobile phone number of the sending phone in the short message, wherein the authentication code of the sending mobile phone in short message is appended to a back end of the mobile phone number of the sending mobile phone.

2. The method of claim 1, wherein the first authentication code in the short message is appended to a back end of the mobile phone number of the destination mobile phone.

3. The method of claim 1, wherein the first authentication code in the short message is appended to a front end of the mobile phone number of the destination mobile phone.

4. The method of claim 1, wherein the first authentication code in the short message is appended to a back end of the message content.

5. The method of claim 1, wherein the first authentication code in the short message is appended to a front end of the message content.

6. The method of claim 1, wherein the method further comprises:

determining, by the authentication apparatus after said ascertaining, that the short message comprises a specified special code;

and responsive to said determining that the short message comprises the specified special code, including, by the authentication apparatus, the authentication code of the sending mobile phone along with the mobile phone number of the sending mobile phone in the short message.

7. The method of claim 6, wherein the specified special code is appended to a back end of the authentication code of the sending mobile phone.

8. The method of claim 1, wherein the method further comprises: determining, by the authentication apparatus after said ascertaining, that the short message does not comprise a specified special code; and responsive to said determining that the short message does not comprise the specified special code, including, by the authentication apparatus, the authentication code of the sending mobile phone along with the mobile phone number of the sending mobile phone in the short message.

9. The method of claim 1, wherein the SMS comprises a SMS service center (SMS-SC), a SMS gateway mobile switching center (SMS-GMSC), and a home location locator (HLR); wherein the method comprises receiving, by the SMS-SC, the short message originating from the sending apparatus; wherein the SMS-SC is configured to generate a new message packet that includes the short message and to send the new message packet to the SMS-GMSC; wherein the SMS-GMSC is configured to receive the new message packet from the SMS-SC and to request from the HLR a current location of the destination mobile phone and to send the short message to the current location of the destination mobile phone; and wherein the HLR is configured to return the current location of the destination mobile phone to the SMS-GMSC in response to the request from the SMS-GMSC for the current location of the destination mobile phone.

10. A server comprising an authentication apparatus, said apparatus includes:

a processor, wherein said processor is configured to perform the steps of:

receiving, by said authentication apparatus, a short message originating from a sending apparatus and directed to a destination mobile phone, wherein the sending apparatus is a sending mobile phone, wherein the short message received by the authentication apparatus comprises message content, a mobile phone number of the destination mobile phone, and a first authentication code of the destination mobile phone, wherein a second authentication code of the destination mobile phone is stored in a memory accessible to the authentication apparatus, and wherein the short message has not been delivered to the destination mobile phone when received by the authentication apparatus, extracting, by the authentication apparatus from the short message, the first authentication code of the destination mobile phone;

extracting, by the authentication apparatus from the memory, the second authentication code of the destination mobile phone;

ascertaining, by the authentication apparatus, that the extracted first authentication code matches the extracted second authentication code;

after said ascertaining: determining that the short message is not SMS spam and not preventing the short message from being subsequently received by the destination mobile phone, said determining that the short message is not SMS spam and said not preventing being performed by the authentication apparatus, determining, by the authentication apparatus after said ascertaining, that an authentication service status of the sending apparatus is activated; and responsive to said determining that the authentication service status of the sending apparatus is activated, including, by the authentication apparatus, an authentication code of the sending mobile phone along with a mobile phone number of the sending phone in the short message, wherein the authentication code of the sending mobile phone in short message is appended to a back end of the mobile phone number of the sending mobile phone.

11. The server of claim 10, wherein the first authentication code in the short message is appended to a back end of the mobile phone number of the destination mobile phone.

12. The server of claim 10, wherein the first authentication code in the short message is appended to a front end of the mobile phone number of the destination mobile phone.

13. The server of claim 10, wherein the first authentication code in the short message is appended to a back end of the message content.

14. The server of claim 10, wherein the first authentication code in the short message is appended to a front end of the message content.

15. The server of claim 10, wherein the method further comprises:

determining, by the authentication apparatus after said ascertaining, that the short message comprises a specified special code; and responsive to said determining that the short message comprises the specified special code, including, by the authentication apparatus, the authentication code of the sending mobile phone along with the mobile phone number of the sending mobile phone in the short message.

16. The server of claim 15, wherein the specified special code is appended to a back end of the authentication code of the sending mobile phone.

17. The method of claim 1 further comprises: determining, by the authentication apparatus after said ascertaining, that the short message does not comprise a specified special code; and responsive to said determining that the short message does not comprise the specified special code, including, by the authentication apparatus, the authentication code of the sending mobile phone along with the mobile phone number of the sending mobile phone in the short message.

* * * * *